United States Patent [19]

Lampert et al.

[11] Patent Number: 4,900,124
[45] Date of Patent: Feb. 13, 1990

[54] BICONIC OPTICAL FIBER CONNECTING DEVICE HAVING ATTENUATOR

[75] Inventors: Norman R. Lampert, Norcross; Naif T. Subh, Lawrenceville, both of Ga.

[73] Assignees: American Telephone & Telegraph Company, AT&T Bell Laboratories, Murray Hill; AT&T Technologies, Inc., Berkeley Heights, both of N.J.

[21] Appl. No.: 283,335

[22] Filed: Dec. 12, 1988

[51] Int. Cl.$^4$ .............................................. G02B 6/38
[52] U.S. Cl. ............................ 350/96.21; 350/96.20
[58] Field of Search ............... 350/96.15, 96.20, 96.21, 350/96.22

[56] References Cited

U.S. PATENT DOCUMENTS

| | | | |
|---|---|---|---|
| 4,145,110 | 3/1979 | Szentesi | 350/96.15 |
| 4,213,932 | 7/1980 | Young | 264/236 |
| 4,257,671 | 3/1981 | Barbaudy et al. | 350/96.15 |
| 4,261,640 | 4/1981 | Stankos et al. | 350/96.15 |
| 4,512,630 | 4/1985 | Runge | 350/96.21 |
| 4,666,243 | 5/1987 | Rogstadius et al. | 350/96.21 |
| 4,714,317 | 12/1987 | Szentesi | 350/96.21 |
| 4,717,234 | 1/1988 | Barlow et al. | 350/96.21 |
| 4,753,511 | 6/1988 | Bowers et al. | 350/96.21 |
| 4,834,486 | 5/1989 | Walker | 350/96.20 |

FOREIGN PATENT DOCUMENTS

| | | | |
|---|---|---|---|
| 52-2441 | 1/1977 | Japan | 350/96.21 X |
| 55-98713 | 7/1980 | Japan | 350/96.21 X |
| 2138161 | 10/1984 | United Kingdom | 350/96.21 X |

OTHER PUBLICATIONS

Balliet et al., "Optical Fiber End Separation Spacer for Fiber Connectors", I.B.M. Tech. Discl. Bull. vol. 27 No. 4B 9/84 pp. 2427-2428.
The Western Electric Engineer article entitled "Interconnection for Lightguide Fibers", authored by T. L. Williford, et al., Winter 1980, pp. 87-95.

*Primary Examiner*—William L. Sikes
*Assistant Examiner*—Brian M. Healy
*Attorney, Agent, or Firm*—Edward W. Somers

[57] ABSTRACT

A biconic optical fiber connector (20) comprising two plugs (24—24) each having truncated conically shaped end portions (30—30) for terminating optical fibers to be connected and a sleeve (66) in which the plug eng portions are received is provided with an attenuator (70) which results in low reflected power. The attenuator comprises a plate-like element which is disposed between the plug end portions. Advantageously, the plugs are seated in the sleeve and the thickness and mounting of the attenuator cooperate to cause the plug ends to engage the attenuator when the plugs are seated in the sleeve cavities. Also, the attenuator is supported within the sleeve so that it is capable of slight movement in a direction parallel to a longitudinal axis (91) of the sleeve to self-adjust, if necessary, as the plug end portions are inserted and become seated in the sleeve.

29 Claims, 4 Drawing Sheets

BICONIC OPTICAL FIBER CONNECTING DEVICE HAVING ATTENUATOR

TECHNICAL FIELD

This invention relates to a biconic optical fiber connecting device having an attenuator. More particularly, the invention relates to a biconic connector having a floating, plate-like attenuator disposed between and in engagement with end portions of plugs of the connector which terminate the optical fibers to be connected.

BACKGROUND OF THE INVENTION

Over the years, optical fiber transmission systems have increased in capacity from about 45 megabits per second (Mb/s) to 1.7 gigabits per second (Gb/s). Failure to operate at a guaranteed level of bit-error rate (BER) depends in part on connections along an optical path and the strength of received signals. BER degradation has been attributed to reflections in the optical path. A series of reflection points can generate multiple reflections among themselves thereby worsening the degradation. This is particularly important in high speed lightwave transmission systems (over 1.0 Gb/s) and amplitude modulated (AM) cable television (CATV).

A very much used connector for terminating and connecting two optical fibers is one which is referred to as a biconic connector. The biconic connector is disclosed in U.S. Pat. No. 4,512,630 which issued on Apr. 23, 1985 in the name of P. K. Runge and in an article authored by T. L. Williford, Jr., K. W. Jackson and C. Scholly appearing at page 87 in the Winter 1980 issue of the Western Electric Engineer and entitled "Interconnection for Lightguide Fibers".

The biconic connector may include two plugs each having a cylindrical portion and a truncated, conically shaped portion with a passageway extending therethrough. An optical fiber end portion is received in the passageway and extends to an end of the truncated conically shaped portion. Each plug is received in one of two conically shaped cavities of a sleeve with surfaces of walls which define the cavities having surfaces which are conformable with those of the truncated, conically shaped portions of the plugs. When the plugs are seated in the sleeve, the end portions of the plugs become disposed adjacent to each other.

Connections between optical fiber ends require great care. Because the core diameter of the optical fiber may be as small as 8 μm, it is difficult to align precisely cores of two optical fibers to be connected to achieve tolerable losses. Not only do the cores of the end portions of two optical fibers to be connected need to be aligned, but also the axes of the optical fiber end portions must be parallel.

Attenuators often are required in an optical fiber transmission path to reduce the strength of an incoming signal to a desired level. Often times, the required attenuation is induced at a patch panel or at an optical backplane where it is most convenient to insert an attenuator between connectors.

Many optical fiber communication systems require a method of decreasing optical power at a reducing station to avoid the saturation of receivers. Such a reduction in power may be accomplished by introducing into the system a device which is designed to dissipate or to attenuate a controlled fraction of the input power while allowing the balance to continue through the system.

Changing attenuation level also may be required. It is known that the efficiency of a circuit decreases with age and that the power of a signal source which may be adequate at the beginning of life of a circuit later may become inadequate. If the power of the signal at the beginning is chosen so that it remains adequate later, components of the circuit may become saturated early in life. Additionally, the unearthing of cable which results in repairs that add optical loss to the transmission path can be compensated for with a lower loss attenuator.

Such attenuators are available commercially in various configurations. Some are inserted at patch panels as mentioned hereinbefore and some are in-line such as is shown in U.S. Pat. Nos. 4,257,671 and 4,261,640. Typically, prior art in-line attenuators are noncontacting, that is, they are not contacted by the fiber ends in the biconic connector plugs.

In one commercially available attenuator, a removable, low loss, low cost frustoconical shaped shim or sleeve of predetermined wall thickness is used in combination with a biconic connector. See U.S. Pat. No. 4,714,317. The shim can easily be removed or replaced with another. Hence, an incoming line may be easily converted to a low loss situation and then converted back or changed to another predetermined loss.

Also of interest is W. C. Young U.S. Pat. No. 4,213,932 which issued on July 22, 1980 and in which a biconical socket is shown to include an internal seat. The seat may be used to position a septum, which can be fabricated from a translucent material to introduce attenuation into an optical path. Alternatively, the septum can be a filter or a wafer soaked in an index matching fluid to improve the optical transmission.

The use of an attenuator in an optical path raises a concern about high reflections and reflected power for systems operating above 1.0 Gb/s. High bit rate systems have been plagued by high reflective loss from attenuators that vary either in the length of the air gap or in carbon density. Reflections in the optical path have not been an issue for systems operating at less than 1.0 Gb/s.

Typically, fixed air gap, non-plug contacting or high density filter elements have beed used in optical transmission systems and data links that use multimode-to-multimode or single mode-to-multimode connections. Typically, these systems of less than one gigabit per second are not affected adversely by high reflected power. However, there is a need for a low reflection attenuator that can be used in single mode-to-single mode connections in optical systems that operate above 1.0 Gb/s.

Light which is reflected from components such as connectors and splices along a fiber link can strike a source of light such as a laser, for example, which may affect adversely the performance of the laser. Optical power fluctuation, pulse distortion and phase noise may result. Also affected adversely may be the wavelength, linewidth and threshold current of the laser.

Multiple reflections from two or more connections may cause system degradation which is referred to as multiple path intereference (MPI). MPI is a phenomenon well known in classical optics and is realized whenever there are two or more optical discontinuities. The two major mechanisms that cause optical discontinuities are connections which are less than ideal and air gap attenuators.

Reflections reduce the signal-to-noise ratio of a receiver by two effects. First, multiple patterns from interferometric cavities that feed back into the transmitter can cause a conversion of the laser's phase noise into intensity noise. The receiver picks up the degraded signal. Also, multiple paths can introduce spacious "ghost signals", which arrive at the detector within variable delays, thereby producing intersymbol interference. Both effects result in an effective power penalty of several dB at the receiver. Inasmuch as these effects are signal dependent, increasing the transmitted power does not improve the error performance. Bit-error ratio floors have been observed in laboratory gigabit/second fiber transmission systems due to multiple reflections from connectors and splices.

Reflections occur at a glass-air interface because of the difference in the refractive indices of the two materials. Each optical fiber with its end face cleaved perpendicularly to the fiber axis reflects at about a 3.5% level. When optical fiber ends are polished, the refractive index increases for a thin surface layer whereupon the reflectance can increase to over 5.5%.

Two surfaces such as the end surfaces of two spliced optical fibers form a cavity within which multiple reflections can occur. When the distance between the end faces equals an integral number of half wavelengths of the transmitter wavelength, all round trip distances equal an integral number of in-phase wavelengths and constructive interference occurs. This cause a quadrupling of reflectance of about 14% for unpolished end faces and to over 22% for polished end faces. On the other hand, a quarter wavelength displacement of the surfaces leads to constructive interference and no reflection.

One way of reducing reflective effects at a transmitter is to use an optical isolator which prevents light from reentering the laser. However, the use of an isolator results in some additional forward transmission loss and possible polarization effects.

Reflectances of components also can be reduced by using an index matching oil or gel between interfaces. Perfect matching is not likely because of the difficulty in matching the complex refractive index profile of the optical fiber, attraction of airborne dust, and because of temperature effects on the index material. Connectors which provide for contacting end faces can be used, if care is taken not to damage the end faces during installation or service. Another prior art technique has been to prepare optical fiber end faces at an angle or with a curved surface so that reflected light is directed away from the optical fiber axis and does not reenter either of the connected fibers. However, angled connectors may result in a slightly increased transmission loss and require both connector plugs to be replaced. Also, anti-reflective coatings can be applied to ends of fibers, but both plugs must be coated, requiring replacement of existing plugs in pairs.

Clearly, what is needed and what has not been provided by the prior art is an in-line, low reflection attenuator which overcomes the foregoing problems. The sought-after attenuator is required for high speed lightwave transmission systems with distributed feedback lasers, and amplitude modulated cable television transmission where unwanted reflections in the network can result in optical feedback into the laser causing laser instability and receiver noise. Also, the sought-after low reflection attenuator is needed to minimize systems degradations due to multiple path interference. The sought after in-line attenuator must be structured keeping in mind that the level of reflected power can be affected by a mismatch in index of refraction in the transmission path, by the length of the gap between optical fiber ends, by laser linewidth, by frequency and by the distance between the two connections.

What is sought and what does not appear to be available in the prior art is a biconic connector which includes an in-line attenuator which results in low return loss. Desirably, the sought after attenuator may be integrated easily and be compatible with existing biconic connection systems.

SUMMARY OF THE INVENTION

The foregoing problems of the prior art have been overcome by the biconic connector of this invention. A biconic connector for connecting two optical fibers each having a core and a cladding includes provisions for attenuation which results in relatively low reflected power. Included are two plugs each having a truncated conically shaped end portion and a passageway extending therethrough for receiving an end portion of an optical fiber to be connected by the plugs. A sleeve includes two back-to-back truncated conically shaped cavities with small diameter portions of each of the cavities being adjacent to each other. Each of the cavities is adapted to receive one of the plugs in a manner so that when the two plugs are seated fully in the cavities with surfaces of the plugs engaging conformable surfaces of walls which define the cavities, ends of the plugs are spaced apart by a predetermined distance. A longitudinal axis of the sleeve extends through the conically shaped cavities.

An attenuating portion of the connector includes a plate-like element which is mounted in the sleeve between the ends of the plugs that are seated in the sleeve and which is perpendicular to the longitudinal axis of the sleeve. The plate-like element has an index of refraction which is about equal to that of the core of the optical fiber. Further, the plate-like element is held in the sleeve and the conformable surfaces of the plugs and the sleeve are such that end faces of the plugs when seated in the sleeve are caused to be in engagement with the plate-like element.

The plate-like element is supported in the sleeve in a manner so that the plate-like element is capable of movement in a direction parallel to the longitudinal axis of the sleeve. This allows the plate-like element to become repositioned in the sleeve as the plugs are seated in the sleeve.

BRIEF DESCRIPTION OF THE DRAWING

Other features of the present invention will be more readily understood from the following detailed description of specific embodiments thereof when read in conjunction with the accompanying drawings, in which:

FIG. 1 is a perspective view of a biconic connector system of this invention which includes an attenuator;

DETAILED DESCRIPTION

Figure 2:
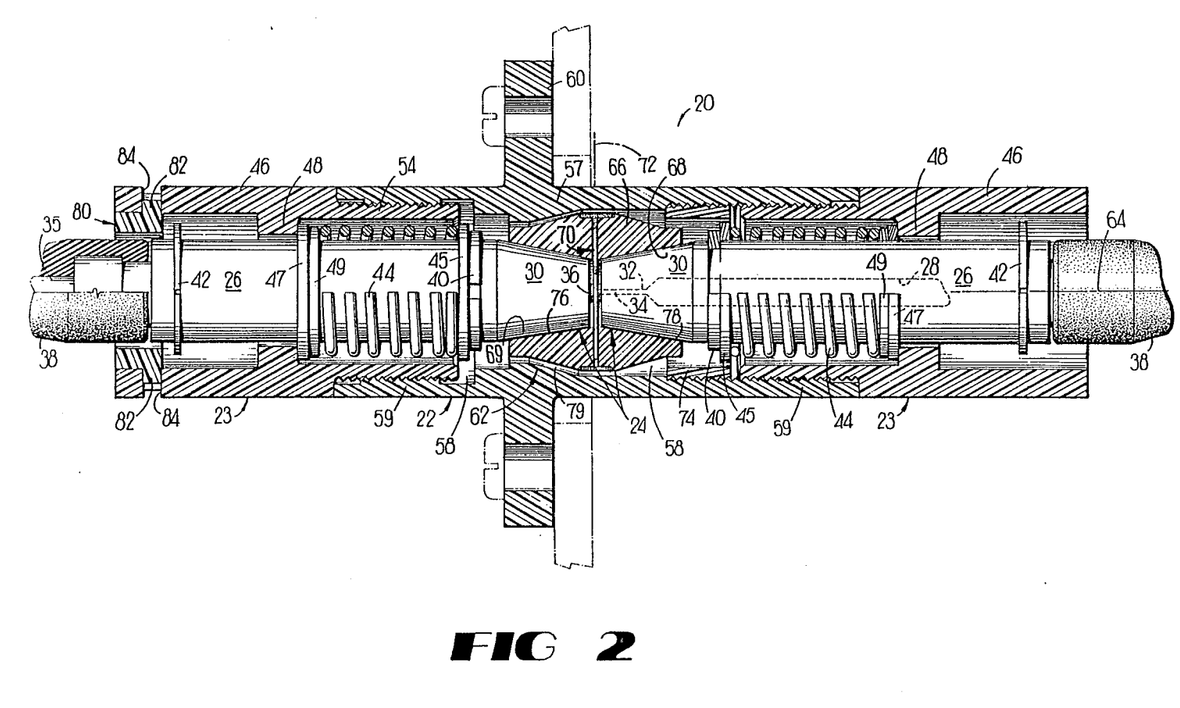
FIG. 2 is an elevational view partially in section of the biconic connector system of this invention.

Referring now to FIG. 1, there is shown a biconic connector designated generally by the numeral 20. The biconic connector 20 includes a coupling 22 for receiving two plug assemblies 23—23. Each plug assembly 23 includes a plug 24 (see FIG. 2) which terminates a lightguide or optical fiber 25. As can be seen in FIG. 2, each plug 24 includes a cyindrical portion 26 which includes a bore 28, and an end portion 30. The end portion 30, which may be referred to as a primary pedestal, has a truncated conical shape and includes a passageway 32 that communicates with the bore 28.

A coated single optical fiber 25 (see FIG. 1) which is terminated with a plug 24 may be jacketed with a plastic material such as polyvinyl chloride to form a jumper cable 35. The jacketing material and the coating are removed from an end portion 34 of the single fiber cable. Then, the cable is inserted into the bore 28 until the bared end portion 34 is received in the passageway 32 with an end portion of the fiber 25 extending into a secondary pedestal 36. An end face of the end portion 34 of the fiber 25 is coincident with the end face of the secondary pedestal 36. The cable at its exit from the bore 28 is provided with a strain relief member 38.

Each plug 24 is provided with a retaining ring and a washer adjacent to its end portion 30. As can be seen in FIG. 2, each of the plugs 24—24 is provided with a retaining ring 40 which abuts a washer 45 and which is fixedly located about the plug 24. A compression spring 44 is disposed about the cylindrical portion 26 of the plug between the washer 45 and another pair of washers 47 and 49. The plug 24 is positioned in an end portion of a holder or cap 46 with the washer 47 and another retaining ring 42 in engagement with an annular lip 48 to hold the plug within the cap. The retaining ring 42 is fixedly attached to the cylindrical portion 26 of the plug 24 whereas the washer 47 is disposed movably thereon. One end of the cap 46 includes an externally threaded portion 54 with the single fiber cable 35 extending from the other end of the cap, the other end being referred to as the cable or optical fiber entrance end.

As mentioned hereinbefore, the coupling 22 (see FIG. 1) of the connector 20 is adapted to receive the two threaded plug caps 46—46 and two plugs 24—24 of two plug assemblies 23—23. The coupling 22 comprises a housing 57 which includes two opposed cavities 58—58 (see FIG. 2) each having a threaded portion 59 and which may or may not include a flange 60 adapted to be mounted to a supporting surface. An internally disposed annular collar 62 extends toward a longitudinal axis 64 of the connector. The housing 57 of the coupling 22 also is adapted to receive an alignment sleeve 66 which comprises two opposed truncated, conically shaped cavities 68 and 69 that meet at a plane 72 common to the two cavities and which includes an attenuator 70.

Both the plug 24 and the sleeve 66 are made of a crushed silicafilled, transfer molding grade epoxy composition, for example, whereas the housing 57 is made of a plastic material, for example. However, it should be understood that the plug and sleeve could be made of other materials, such as metallic materials, for example.

The alignment sleeve 66 is disposed within the housing 57 so that when the caps 46—46 and the externally threaded portions 54—54 thereof are turned into internally threaded portions 59—59 in the cavities 58—58, the ends 30—30 of the plugs which are mounted in associated caps are received in cavities 68 and 69 with the secondary pedestals 36—36 in the vicinity of the common plane 72. Also, as the threaded portions 54—54 of the caps 46—46 are turned into the housing 57, the plug portions 26—26 are moved through the opening defined by the lips 48—48 to move the retaining rings 42—42 out of engagement with the lips. Prior to the turning of a cap 46 of a plug assembly 23 into the housing 57, the spring 44 thereof is in compressive engagement with the washers 49 and 47 which together engage one side of the lip 48 and biases the plug outwardly of the cap. As a result, the retaining washer 42 is caused to be held in engagement with an opposite side of the annular lip 48.

The retaining ring 40 of the right hand plug as viewed in FIG. 2 is adjacent to an externally threaded collar 74 which is turned threadably into the right hand cavity 58, as viewed in FIG. 2, and which holds the sleeve 66 within the housing 57. The collar 74 is threadably secured inside the coupling 22 and, although not necessarily in engagement with the sleeve, it prevents the sleeve from being removed inadvertently from the housing. The spring 44 causes the right hand plug end portion 30 to be seated firmly in engagement with a wall 78 of the cavity 68 of the alignment sleeve 66. Further, the left plug end 30 as viewed in FIG. 2 is moved into the cavity 69 of the sleeve 66 and contacts a wall 76. It is important to recognize that the sleeve 66 floats within an opening 79 between the collar 62 and the threaded collar 74 to facilitate alignment of the two plugs 24—24. As a result, upon the application of axial forces to either one of the plugs 24—24, such as for example by the application of tensile forces to one of the cables 35—35, the sleeve, together with the plugs seated in the cavities thereof, is capable of movement through a distance, termed herein the first distance, prior to the occurrence of any relative movement between the sleeve and either of the plugs.

Ideally, to achieve minimum loss, the plugs 24—24 disposed within the sleeve 66 should have their longitudinal axes aligned and end faces of the fibers with the secondary pedestals 36—36 contacting the attenuator 70. The outer surface of the conical end 30 of each plug 24 and the surfaces of the walls 76 and 78 of the sleeve cavities are associated conformable alignment surfaces which are intended to cause desired positioning of the pedestals 36—36 when the conical end portions of the plugs are received in the sleeve 66. When disposed in the alignment sleeve 66, the plugs 24—24 should have a desired end separation based on the distance between reference boundaries of the cavities 68 and 69. Likewise the so-called taper length of each plug, defined as the distance from a reference circumference on the plug boundary to the end face of the secondary pedestal 36, should be a specified distance.

Viewing now the right side of FIG. 2, it should be apparent that the end of each prior art cap 46 is open and that the opening therein is large enough to permit passage of the retaining ring 42. Consequently, should axial tensile forces be applied to one of the cables 35—35, the spring 44 is compressed and the plug assembly is moved in a direction away from the center of the coupling housing. It may be moved a distance which is greater than the first distance and which is sufficient to cause relative movement between the plug of the cable which is pulled and the sleeve. This causes movement apart of the secondary pedestals of the two plugs within the housing, resulting in an optical disconnection of the two optical fibers terminated by the plugs.

Furthermore, undesired results also occur should lateral forces be applied to the cables or plug assembly. In that event, the cylindrical portion of the plug engages the annular lip 48 (see again the right hand side of FIG. 2) causing the plug to move pivotally about the lip which acts as a fulcrum. As a result, the secondary pedestal of the pivotally moved plug becomes canted causing optical disconnection between the optical fibers.

The connector 20 may include provisions for overcoming these potential problems. As can be seen in the left side of FIG. 2, the cap 46 may be provided with an end retainer 80 adjacent to the cable entrance end of the cap. The end retainer includes two diametrically opposed tabs 82—82. Each tab 82 is designed to be received in an opening 84 in the housing of the cap. Provided may be an annular end retainer adapted to have a portion thereof received in a groove at the cable entrance end of the cap, or the end retainer could be provided with one or more tabs, or could be bonded to the cap. The end retainer 80 preferably is in the form of a split ring to allow the end retainer to be collapsed for installation. Such an arrangement may be provided at both ends of the coupling 22.

A retaining ring 42 is attached to the cylindrical portion 26 of a plug on the left portion of FIG. 2 so that when the plug portion 30 is seated in the sleeve 66, the retaining ring is disposed adjacent to the end retainer 80 and spaced a predetermined distance therefrom. The predetermined distance, which is referred to as the second distance, is less than the first distance, referred to hereinbefore with respect to movement of the sleeve together with the plugs therein.

Advantageously, the end retainer 80 is sized so that the retaining ring 42 cannot pass therethrough. Hence, when axial tensile forces "F" (see FIG. 1) are applied to the cable 35, the associated plug 24 is moved outwardly of the coupling housing only slightly through the second distance until the retaining ring 42 engages the end retainer 80. The movement is controlled so that optical disconnection of the two optical fibers is prevented.

Figures 3, 4:
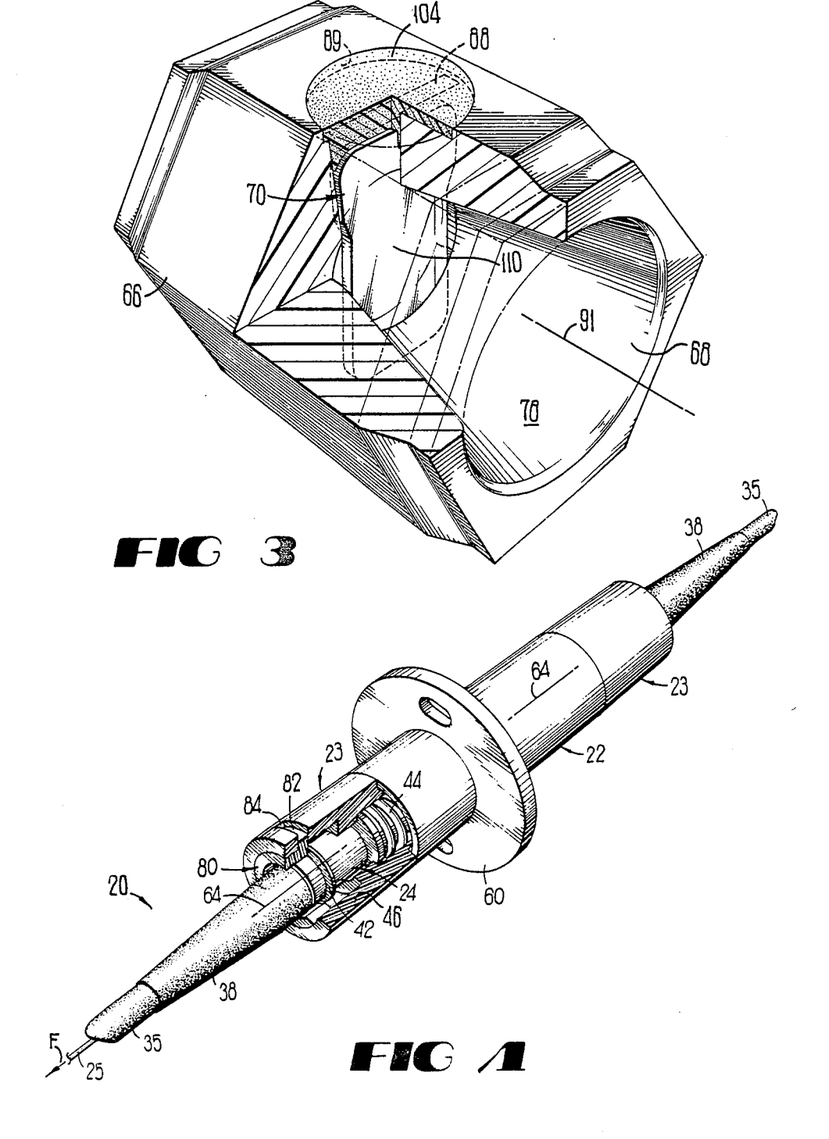
FIG. 3 is a perspective view of a sleeve having an attenuator disposed therein.
FIG. 4 is an enlarged elevational view of the sleeve of FIG. 3 in which the attenuator is disposed with two plugs to be received in the sleeve being shown in phantom.
Figure 4:
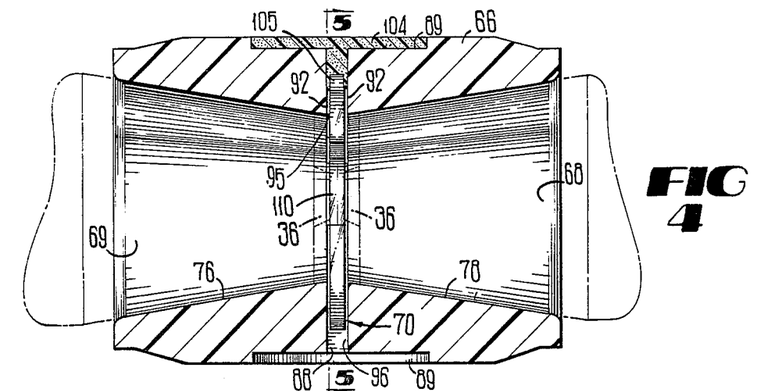
Figure 5:
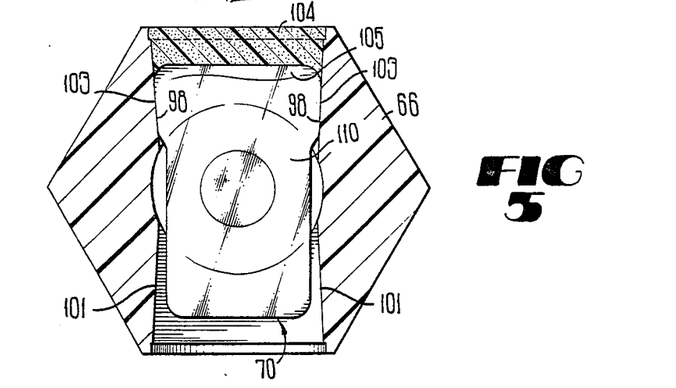
FIG. 5 is an end view of the attenuator of FIG. 4 taken along line 5—5 thereof.

The connector 20 includes provisions for adding attenuation and reducing return loss. As can be seen in FIGS. 3-5, the sleeve 66 is provided with a slot 88 for receiving the attenuator 70. The slot 88 which opens to a recess 89 is such that when the attenuator 70 is received therein, the attenuator is normal to a longitudinal axis 91 of the sleeve. One pair of walls 92—92 of the sleeve which are parallel to each other and which are perpendicular to the longitudinal axis 91 define the slot whereas other portions 95 and 96 include tapered walls.

Viewing now FIG. 5, which is taken along lines 5—5 of FIG. 4, it can be seen that the portions 95 and 96 have tapered walls 98—98 and 101—101, respectively. The walls 98—98 are adapted to engage tapered side edge surfaces 103—103 of the attenuator 70 to hold the attenuator wedged within the sleeve. Also, an adhesive material 104 or other means may be provided in an outer portion of the slot to retain the attenuator within the sleeve. Also, an adhesive material 104 or other means may be provided in an outer portion of the slot to retain the attenuator within the sleeve. A header portion 105 of the attenuator 70 includes the tapered side edge surfaces 103—103 which engage with the tapered wall surfaces 98—98 of the slot walls to support the attenuator.

Figure 6:
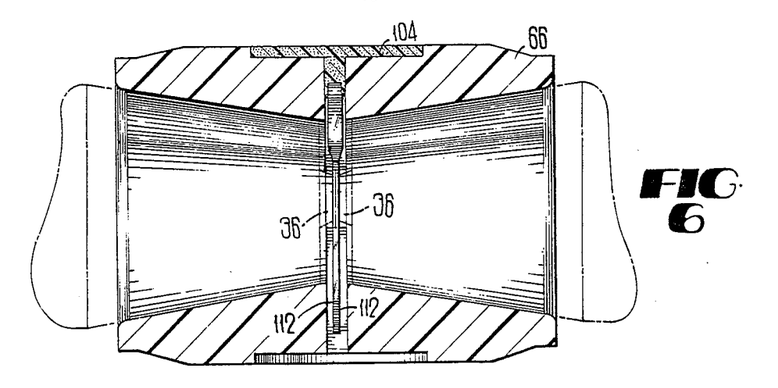
FIG. 6 is a view of another embodiment of an attenuator of a biconic connector system of this invention with plugs to be received in the sleeve being shown in phantom.

The attenuator 70 is designed to be able to float within the sleeve 66. Viewing again FIGS. 3-5, it can be seen that an operative stem portion 110 of the attenuator has substantially the same thickness as that of the header portion 105. The walls of the sleeve which define the slot 88 are such that there is a clearance on the order of about 0.05 mm in a direction along the axis 91 between the operative portion and the walls 92—92 adjacent to the sleeve cavity. This clearance is suitable for 10, 15 and 20 dB attenuation. For a 5 dB attenuation, the operative portion of the attenuator is necked down from its header portion to provide additional gaps 112—112 (see FIG. 6). For the 5 dB attenuator, the operative portion of the attenuator has a thickness of about 0.22 mm whereas the end separation of the sleeve is slightly less. This necessarily results in a contacting of the attenuator by the plug ends.

What is important is the adjustable nature of the attenuator 70 in the slot 88. As one biconic plug is inserted into one end of the sleeve 66 and seated therein, the attenuator is engaged by an end of the inserted plug to cause the attenuator to be moved slightly in the same direction as the direction of insertion, that is in a direction parallel to the longitudinal axis 64 of the connector. Then when the other plug is inserted into the opposite end of the sleeve, the end of the plug engages the attenuator and causes it to be held securely between the two plugs. The floating support of the attenuator is accomplished by replacing the air gap between fiber ends of two plugs with a material element having a thickness which is equal to or greater in thickness than the air-gap dimensions. Also, the attenuator has an index of refraction which is similar to that of the transmitting core, i.e. glass.

The sleeve end separation which is the distance as measured in a direction parallel to the longitudinal axis 91 between two gauging balls each of which has been inserted into one of the cavities, can be shortened by appending a sleeve with a wide slot to a shorter end separation. This allows the installation of filters having thicknesses on the order of 0.22 mm or less for a 5 dB or less loss, while maintaining contact, sleeve end separation and float.

Well known splice-loss theory predicts single mode insertion loss (IL) for longitudinally displaced fibers. Additionally, Snell's law of refraction describes how light waves behave between materials with different indices of refraction, causing bending of light rays. Light accepted by the second fiber must impinge the core area and be within the critical angle of the fiber to be received.

In this invention, the attenuator element thickness was determined by the following equation, and verified experimentally for both IL and return loss (RL) on polycarbonate and acrylic elements.

The material thickness of the operative portion of the attenuator 70 can be determined from the following equation for insertion loss:

$$IL = -10\log\left(\frac{1}{1 + (z_0/k_g w^2)^2}\right) + IL_{gap}(dB)$$

where
$z_o$ is the gap between fibers,
$k_g = 2\pi n_o/\lambda$
w = mode field radius (MFR)
and
$MFR_{1310\,nm} = 4.35\ \mu m$
$MFR_{1550\,nm} = 4.85\ \mu m$.

Figure 7:
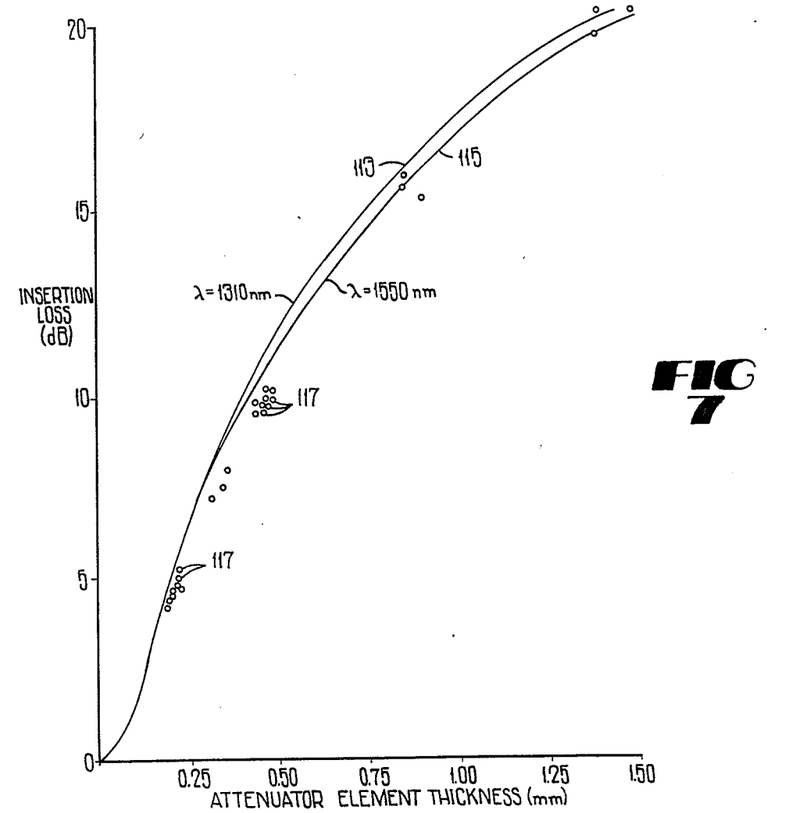
FIG. 7 is a graph which depicts the relationship between the attenuator thickness and insertion loss.

FIG. 7 shows two curves designated 113 and 115 which depict the relationship between the thickness of the attenuator element and the theoretical insertion loss for two wavelengths, 1310 nm and 1550 nm. It should be noted that insertion loss, which is a function of wavelength and mode field radius, is nearly independent of wavelength. FIG. 7 includes data designated by points 117—117 from biconic connectors of this invention.

The biconic connection arrangement of this invention which includes the attenuator 70 results in substantially lower reflected power than in prior art arrangements. As is known, the index difference, n, along an optical path causes reflection stated by the following equation for return loss:

$$RL = 10\log\left(\frac{(n_0 - n_1)}{(n_0 + n_1)}\right)^2$$

In one example in which ends of two optical fibers are connected through a biconic connector, glass-to-air interfaces were established with an $n_o$ of 1.0 for air and an $n_1$ of 1.468 for the core glass of each optical fiber. Applying the foregoing equation for R.L., it can be seen that the reflected power was found to be approximately 3.6% or −14.4 db.

For this arrangement, both glass-to-air and air-to-glass interfaces contribute to the reflected power, which can be uncomfortably high. On the other hand, for a substantially larger air gap, the reflected loss is dominated by that interface between core glass and air which is first encountered in the direction of light transmission. The second interface, that is from air-to-glass in the direction of transmission, has much less effect because of the attenuation caused by the transmission through the lengthened air gap.

Another arrangement may include spaced fiber ends with an acrylic or Mylar plastic, in-line, disc-like attenuator suspended in the air gap. In this attenuator there are multiple reflected surfaces, even though, at best, the attenuator can contact only one fiber end with an air gap between the attenuator and the other fiber end. Even with an attenuator material having an index $n_o$ which is close to that of glass, high reflections can occur when relatively small air gaps exist. For low attenuation values, this gap is more critical. Reflected power in this arrangement, where the fiber contacts only one side of the optical disc, also is a function of the direction of optical transmission through the attenuator-air gap. The reflected power generally will be less if the direction of the transmission is through a contacting optical fiber-attenuator interface, through the attenuator and through the air gap to the second fiber end. If the direction of transmission is in the opposite direction, the reflected power can be similar to that across a relatively small air gap without an attenuator.

The attenuator arrangement of the biconic connector 20 of this invention results in significantly less reflected power than in prior art arrangements. This is accomplished by causing both plugs to engage the in-line attenuator 70. It should be noted that the second acrylic-to-optical fiber core glass interface, providing there is contact with the plug ends, is of less consequence because the low level of reflected power from the second interface would be attenuated by the two way loss of the attenuator 70. For example, the total return loss from an arrangement in which there is a −40 dB loss from a first glass to attenuator interface and a −40 dB loss from the second interface between the attenuator and glass, on the outgoing side, and a 10 dB attenuator which contributes 20 dB for a round trip amounts to −39.96 dB. This is a negligible difference from that provided at the first interface.

In one test route, the paths which each include an optical fiber, splices, and two connections, but which did not include an attenuator, exhibited a total return loss in the range of from about 28.17 dB to about 30.60 dB. When an air gap attenuator was entered into the path, the average total return loss changed to 14.48 dB, whereas an attenuator which included a Mylar plastic/carbon element suspended in an air gap showed an average return loss of 10.28 dB. Buildouts which included the biconic connection arrangement of this invention and a non-attenuated connector, splices and fibers exhibited total return losses which ranged from 34.10 dB to 37.26 dB.

Advantageously, the connector 20 of this invention is compatible with existing connectors in the field. For example, if all new sleeves were to be provided with an attenuator, it becomes important that plugs already in use in the field be usable with such sleeves. As should be apparent, the use of a sleeve 66 with an attenuator 70 in no way impedes its use with existing plugs. Also, a plug which is provided with an end retainer may be coupled to one which does not. As a result, the fact that the plug is provided with an end retainer does not impede its assembly with a sleeve having an attenuator or other biconic connector plug.

Even though the retaining ring 42 is moved a slight distance, i.e. the second distance, in the embodiment shown in the left hand portion of FIG. 2 before it engages the entrance retainer 80, the optical connection between the secondary pedestals and the attenuator 70 is not broken. If axial forces are applied to the cable 35 on the left side of FIG. 2, the spring 44 on that side is compressed. However, the compression spring associated with the right hand side of FIG. 2 urges its associated plug to the left thereby maintaining contact between the secondary pedestals. This is further facilitated because, as explained hereinbefore, the sleeve 66 floats within the housing. As a result, the sleeve 66 can be moved the first distance to the left as viewed in FIG. 2 prior to the sleeve becoming seated within the coupling housing. Because of the relationship between the first and second distances, the second distance through which the retaining ring 42 is moved before it engages the end retainer 80 is such that the retaining ring engages the end retainer before the sleeve 66 becomes seated in the housing 57. This arrangement prevents unwanted optical disconnection between the optical fibers terminated by the plugs and between the plugs and the attenuator 70.

The use of an end retainer in a plug assembly 23 also is helpful in preventing the canting of the associated plug through a sufficient angle to affect adversely engagement of the plug end face with the attenuator 90. Advantageously, the application of lateral forces "F" to the plug body on the left side of FIG. 2 will cause the plug to engage the inner annular surface of the end retainer 80 before the plug body engages the annular lip 48. As a result, pivotal movement of the plug within the cap is eliminated substantially thus preserving the connection of the plugs with the attenuator.

Figure 8:
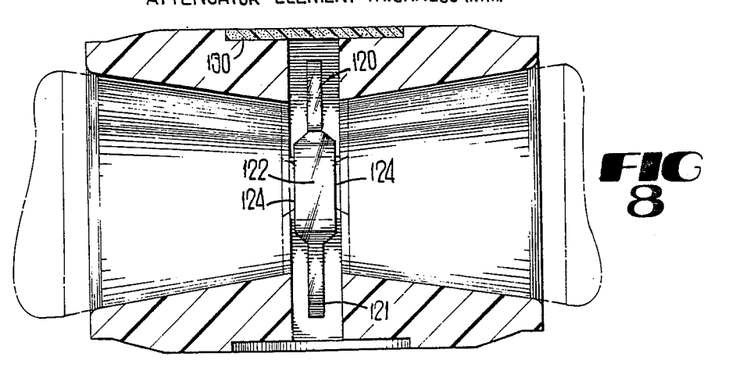
FIG. 8 is a view of still another embodiment of an attenuator disposed in a sleeve with the two plugs to be received n the sleeve being shown in phantom.

A further embodiment of the invention is depicted in FIG. 8. Should the slot 88 be manufactured so that a relatively tight fit occurs between a lower portion of the stem and the walls of the slot of the embodiment shown in FIG. 6, for example, movement of the attenuator 70 may be inhibited to the point that one of the secondary pedestals 36—36 of the plugs does not engage the attenuator. In order to overcome this potential problem, an attenuator 120 is provided. The attenuator 120 is provided with a stem 121 having an operative portion 122 which includes projecting portions 124—124. The distance by which the portions 124—124 project is such that engagement of the plug end pedestals 36—36 with those portions is assured. In the embodiment shown in FIG. 8, an adhesive-backed tape 130 may be used to retain the attenuator in the sleeve slot.

It is to be understood that the above-described arrangements are simply illustrative of the invention. Other arrangements may be devised by those skilled in the art which will embody the principles of the invention and fall within the spirit and scope thereof.

We claim:

1. A biconic connector which provides attenuation for connecting two optical fibers, each having a core and a cladding, in a manner which results in relatively low reflected power, said connector comprising:

two plugs each having a truncated conically shaped end portion and a passageway extending therethrough for receiving an end portion of an optical fiber to be connected by said plugs;

a sleeve which includes two truncated conically shaped cavities with small diameter portions of each of said cavities being adjacent to each other and with a longitudinal axis of said sleeve extending through said cavities, each of said cavities being adapted to receive one of said plugs in a manner so that when said two plugs are seated fully in said cavities with surfaces of said plugs engaging conformable surfaces of walls which define said cavities, ends of said plugs are spaced apart by a predetermined distance; and a plate-like element which is mounted in said sleeve perpendicular to said longitudinal axis between said ends of said plugs that are seated in said sleeve and which has an index of refraction equal about to that of the core of the optical fibers, said plate-like element being mounted in said sleeve and the mating of the conformable surfaces of said sleeve and of said plugs being such as to cause said plugs when seated in said sleeve to be in engagement with said plate-like element.

2. The connector of claim 1, wherein said plate-like element is supported in said sleeve in a manner so that said plate-like element is capable of movement in a direction parallel to the longitudinal axis of the sleeve to allow said plate-like element to become repositioned in said sleeve as said plugs are seated in said cavities.

3. The connector of claim 1, wherein said plate-like element is made of a relatively rigid material.

4. The connector of claim 1, wherein said plate-like element has a uniform thickness and is mounted within said sleeve along a common plane which extends along the small diameter portion of each said cavity.

5. An optical fiber connector for connecting two optical fibers, said connector comprising:

first and second plug assemblies each including a plug having a truncated conically shaped portion which is adapted to terminate an optical fiber, and a cap which is associated with and assembled to said plug such that relative rotational motion between said cap and said plug can occur with said cap of at least one of said plug assemblies including an end retainer adjacent to an optical fiber entrance end thereof;

a sleeve for receiving the conically shaped portion of the plug of said first plug assembly in one end cavity thereof and the conically shaped portion of the plug of said second plug assembly in another end cavity thereof with a mating surface of each plug adapted to engage a conformable mating surface of said sleeve to become seated therein, said sleeve including a longitudinal axis which extends from the one end to the other end thereof;

energy storage means disposed about each of said plugs for causing said plug to be biased outwardly of its associated cap so that said conically shaped portion of the plug is capable of being received in one of the cavities of said sleeve;

coupling means for suspending said sleeve therein in a manner which upon the application of axial forces to one of the plugs allows said sleeve with said plugs therein to be moved through a first distance in a direcion parallel to the longitudinal axis of the sleeve relative to said coupling means prior to the occurrence of relative movement between said plugs;

means for securing each of said plug assemblies to said coupling means;

annular means disposed about each said plug adjacent to its optical fiber entrance end for holding each said plug within its associated cap with said annular means of one of said plugs being effective when said conically shaped portion of said plug becomes seated in a cavity of said sleeve for becoming disposed a second distance, which is less than the first distance, from said end retainer so that upon axial forces being applied to said one of the plugs, said one plug is restricted to be moved axially the second distance; and a plate-like attenuating element which is adapted to be mounted in said sleeve between said ends of said plugs that are seated in said sleeve perpendicular to said longitudinal axis and which has an index of refraction equal about to that of the core of the optical fibers, the mounting of said plate-like element in said sleeve and the mating of said conformable surfaces of said sleeve and of said plugs being such as to cause said plugs when seated in said sleeve to be in engagement with said plate-like element.

6. The optical fiber connector of claim 5, wherein said sleeve is disposed within a housing of said coupling means and is capable of movement therein in a direction parallel to the longitudinal axis.

7. The optical fiber connector of claim 5, wherein said plug of each plug assembly includes a truncated conically shaped end portion and a cylindrical portion connected thereto, said trucated conically shaped portion extending beyond an end of said cap, said cylindrical portion having a compression spring disposed thereabout to bias said plug into said sleeve with each end of said spring engaging a washer which is disposed about said plug with one of the washers engaging an annular inwardly projecting lip of the associated cap and wherein a first retaining ring is fixedly disposed about said cylindrically shaped portion adjacent to said truncated conically shaped portion and in engagement with the other one of the washers, and wherein said annular means is a second retaining ring secured to said cylindrical portion of each said plug, said second retaining ring engaging said annular lip when said plug is not seated in one of the cavities of said sleeve.

8. The optical fiber connector of claim 7, wherein said housing includes an internally threaded portion at each end thereof for receiving an externally threaded portion of one of said plug assemblies.

9. The optical fiber connector of claim 7, wherein said second retaining ring is attached to said plug so that when portions of said plugs are in engagement with said plate-like element, said second retaining ring of said one plug is spaced from said end retainer the second distance which is less than that which said sleeve must be moved to seat in engagement with an internal surface of said housing.

10. The optical fiber connector of claim 5, wherein the difference between the diameter of said end retainer and said one plug is less than the difference between said annular lip and said one plug so that upon the application of lateral forces to a plug, said one plug will engage said end retainer prior to engaging said lip.

11. An optical fiber connection, which includes:
a coupling which includes a housing having opposed cavities each having an internally threaded entrance portion and which includes a longitudinal axis;
first and second plug assemblies each being mounted to said coupling and each including:
a plug having a truncated conically shaped end portion and a passageway extending therethrough;
a cap associated with said plug and in which said plug is mounted with a threaded portion thereof engaged with a threaded portion of said housing, said cap capable of being turned rotatably with respect to said plug, said cap including an optical fiber cable entrance end;
spring means disposed about said plug and being effective to urge said plug in a direction away from said cable entrance end; and
an optical fiber cable including an optical fiber transmission portion and an optical fiber end portion which is disposed in the passageway of each of said plugs with an end of each fiber terminating in an end face of the plug in which it is mounted;
sleeve means disposed in said housing and having opposed truncated conically shaped cavities in each of which is disposed one of said truncated conically shaped portions of said plugs, with walls which define the cavities including surfaces conformable to and mating with outer surfaces of said plugs, and with small diameter portions of said cavities being disposed adjacent to a common plane, said sleeve means together with the plugs therein being capable of movement through a distance in a direction parallel to the longitudinal axis of the coupling and relative thereto prior to the occurrence of relative movement between a plug and said sleeve means, said sleeve means including a slot which is disposed perpendicular to the longitudinal axis adjacent to the common plane; and
a plate-like attenuator element which is adapted to be mounted in said slot of said sleeve means between ends of said plugs that are seated in said sleeve, said plate-like element held in said sleeve and the mating of said conformable surfaces of said sleeve and of said plugs being such as to cause said plugs when seated in said sleeve to be in engagement with said plate-like element.

12. The optical fiber connection of claim 11, wherein said attenuator element is made of a material having an index of refraction substantially equal to that of the transmission portion of each said optical fiber cable.

13. The optical fiber connection of claim 12, wherein said attenuator element is made of an acrylic material.

14. The optical fiber connection of claim 11, wherein said attenuator element includes a header portion and an operative portion, said operative portion adapted to be engaged by said first and second plugs, and said header portion being supported by tapered walls of said slot in which said header portion is disposed.

15. The optical fiber connection of claim 14, wherein in a direction along the longitudinal axis of said connector, said header portion and said operative portion have substantially the same thickness.

16. The optical fiber connection of claim 14, wherein in a direction along the longitudinal axis of said connector, said header portion includes a thickness which is substantially greater than that of said operative portion.

17. The optical fiber connection of claim 11, wherein said plate-like attenuator element is removable from said housing.

18. A sleeve which is adapted to receive a truncated, conically shaped end portion of each of two truncated, conically shaped plugs each of which plugs terminates an optical fiber, to connect the optical fibers, said sleeve comprising:
a housing which includes two truncated conically shaped cavities with small diameter portions of each of said cavities being adjacent to each other and which includes a longitudinal axis that extends through said housing, each of said cavities being adapted to receive an end portion of a truncated conically shaped plug which terminates an optical fiber, said housing including a slot which is perpendicular to said longitudinal axis and which is disposed between said two cavities, each of said cavities being adapted to receive one of said plugs in a manner so that when said two plugs are seated fully in said cavities with surfaces of said plugs engaging conformable surfaces of walls which define said cavities, said plugs are spaced apart by a predetermined distance; and
a plate-like element which is disposed in said slot between ends of plugs that are destined to be disposed in said cavities and having an index of refraction about equal to that of a transmission portion of each optical fiber, said plate-like element being supported in said housing and the mating of the conformable surfaces of said sleeve and of said plugs being such as to cause the plugs when seated in the sleeve to be in engagement with said plate-like element, said plate like element being effective to provide attenuation for optical signals carried by the optical fibers with relatively low reflected power.

19. The sleeve of claim 18, wherein said plate-like element is supported in said sleeve in a manner so that said plate-like element is capable of movement in a direction parallel to the longitudinal axis of said housing to allow said plate-like element to become repositioned in said housing as plugs are seated in said cavities.

20. The sleeve of claim 18, wherein said predetermined distance is less than the thickness of said plate-like element as measured in a direction parallel to the longitudinal axis.

21. The sleeve of claim 20 wherein said plate-like element includes a header and a stem, said stem adapted to be engaged by said first and second plugs, and said header being supported by tapered walls of said slot in which said header is disposed.

22. The sleeve of claim 21, wherein in a direction along the longitudinal axis of said connector, said header and said stem have substantially the same thickness.

23. The sleeve of claim 21, wherein in a direction along the longitudinal axis of said housing, said header includes a thickness which is substantially greater than that of said stem.

24. The sleeve of claim 21, wherein said stem, which is adapted to be engaged by each of the plugs to be received in said sleeve, includes an operative portion which has a thickness as measured in a direction parallel to the longitudinal axis of said housing which is greater than that of the remaining portion of said stem.

25. The sleeve of claim 24, wherein said operative portion of said stem includes opposed projecting portions, each projecting portion extending in a direction parallel to the longitudinal axis into a cavity of said housing in which is to be received a plug.

26. The sleeve of claim 18, wherein means is provided for retaining said plate-like element within said slot.

27. The sleeve of claim 26, wherein said means for retaining said plate-like element is an adhesive material.

28. The sleeve of claim 26, wherein said means for retaining said plate-like element covers said slot where said slot opens to an outer surface of said sleeve.

29. The sleeve of claim 18, wherein said plate-like element includes tapered edge surfaces which are parallel to said longitudinal axis and wherein at least a portion of said slot is defined by tapered walls which are conformable with said tapered edge surfaces of said plate-like element to hold said plate like element in said slot.

* * * * *